US009619438B2

(12) United States Patent
Nunes et al.

(10) Patent No.: US 9,619,438 B2
(45) Date of Patent: Apr. 11, 2017

(54) EMBEDDING BITMAP FONTS IN PDF FILES

(71) Applicant: Hewlett-Packard Development Company, L.P., Houston, TX (US)

(72) Inventors: Veronica Andrade Aveline Nunes, Porto Alegre (BR); Marcelo Aita Riss, Porto Alegre (BR); Fabio Santos Nallem, Porto Alegre (BR); Jon Brewster, Corvallis, OR (US); Catherine K Flager, Corvallis, OR (US); Marcelo Peres, Porto Alegre (BR); Arthur Zanardi, Porto Alegre (BR); Danilo deSousa, Porto Alegre (BR); Leticia Silva, Porto Alegre (BR); Lucas Gessoni, Porto Alegre (BR); Leonardo Domingues, Porto Alegre (BR); Marcia dosSantos, Porto Alegre (BR)

(73) Assignee: Hewlett-Packard Development Company, L. P., Houston, TX (US)

( * ) Notice: Subject to any disclaimer, the term of this patent is extended or adjusted under 35 U.S.C. 154(b) by 483 days.

(21) Appl. No.: 13/754,637

(22) Filed: Jan. 30, 2013

(65) Prior Publication Data

US 2014/0215325 A1      Jul. 31, 2014

(51) Int. Cl.
*G06F 17/00* (2006.01)
*G06F 17/21* (2006.01)
*G06F 17/22* (2006.01)

(52) U.S. Cl.
CPC ........ *G06F 17/214* (2013.01); *G06F 17/2264* (2013.01)

(58) Field of Classification Search
CPC ...... G06F 17/273; G06F 3/0237; G06F 17/21; G06F 17/22; G06F 17/24; G06F 17/214; G06F 17/2264
(Continued)

(56) References Cited

U.S. PATENT DOCUMENTS 7,197,706 B1    3/2007  Berson et al.
7,319,532 B2    1/2008  Oomura et al.
(Continued)

OTHER PUBLICATIONS

Illustrator / Saving Artwork, 2012, pp. 1-13, Adobe, Available at: <help.adobe.com/en_US/illustrator/cs/using/WS714a382cdf7d304e7e07d0100196cbc5f-6561a.html>.

(Continued)

*Primary Examiner* — Scott Baderman
*Assistant Examiner* — Jason Edwards
(74) *Attorney, Agent, or Firm* — HP Inc. Patent Department

(57) ABSTRACT

Techniques pertaining to embedding fonts in a PDF document are disclosed. A processing component executing a PDF application programming interface (API) may be operative to identify each character in a PDF file associated with an un-embedded font. The PDF API may store a bitmap representation for each identified character in the PDF file associated with the un-embedded font. The PDF API may then create a bitmap font character from the bitmap representation for each identified character in the PDF file associated with an un-embedded font and replace each reference to a character in the PDF file associated with an un-embedded font with a reference to its corresponding bitmap font character.

21 Claims, 6 Drawing Sheets

(58) Field of Classification Search
USPC .......................................................... 715/271
See application file for complete search history.

(56) References Cited

U.S. PATENT DOCUMENTS

| | | | |
|---|---|---|---|
| 7,570,374 | B2 | 8/2009 | Kawara |
| 8,437,013 | B2* | 5/2013 | Eschbach et al. ........... 358/1.11 |
| 8,819,541 | B2* | 8/2014 | Nicholas et al. ............. 715/236 |
| 8,910,036 | B1* | 12/2014 | Cromwell ......... H02M 3/33592 715/234 |
| 2002/0087702 | A1 | 7/2002 | Mori |
| 2007/0139680 | A1* | 6/2007 | Eschbach ............. G03G 21/043 358/1.11 |
| 2011/0276872 | A1* | 11/2011 | Kataria et al. ................ 715/234 |

OTHER PUBLICATIONS

Steve G. Probets and David F. Brailsford, "Substituting Outline Fonts for Bitmap Fonts in Archived PDF Files," May 22, 2001, Software-Practice and Experience, Issue 33(9). 2003, pp. 885-899. Available at: <eprints. nottingham.ac.uk/195/1/fonts.pdf>.
Copresco, "Why Some Fonts Can't Be Embedded in PDF," 2005, <http://web.archive.org/web/20060313161012/http://www.copresco.com/lite05/03051tx.htm> (2 pages).
The Graphic Mac, "PDF font subsetting explained," Oct. 4, 2007, <http://www.thegraphicmac.com/pdf-font-subsetting-explained> (5 pages).
Wikipedia, "Font embedding," (Jan. 25, 2013 revision),<https://en.wikipedia.org/w/index.php?title=Font_embedding&oldid=534808702> (2 pages).
Wikipedia, "Portable Document Format," (Dec. 29, 2012 revision), <https://en.wikipedia.org/w/index.php?title=Portable_Document_Format&oldid=530325875> (25 pages).

* cited by examiner

"TOM!"

No answer.

"TOM!"

No answer.

"What's gone with that boy, I wonder?

You TOM!" No answer.

The old lady pulled her spectacles down and looked over them about the room; then she put them up and looked out under them. She seldom or never looked THROUGH them for so small a thing as a boy; they were her state pair, the pride of her heart, and were built for "style," not service--she could have seen through a pair of stove-lids just as well. She looked perplexed for a moment, and then said, not fiercely, but still loud enough for the furniture to hear:

"Well, I lay if I get hold of you I'll--"

She did not finish, for by this time she was bending down and punching under the bed with the broom, and so she needed breath to punctuate the punches with. She resurrected nothing but the cat.

"I never did see the beat of that boy!"

FIG. 5
500

"TOM!"

No answer.

"TOM!"

No answer.

"What's gone with that boy, I wonder?

You TOM!" No answer.

The old lady pulled her spectacles down and looked over them about the room; then she put them up and looked out under them. She seldom or never looked THROUGH them for so small a thing as a boy; they were her state pair, the pride of her heart, and were built for "style," not service--she could have seen through a pair of stove-lids just as well. She looked perplexed for a moment, and then said, not fiercely, but still loud enough for the furniture to hear:

"Well, I lay if I get hold of
you I'll--"

She did not finish, for by this time she was bending down and punching under the bed with the broom, and so she needed breath to punctuate the punches with. She resurrected nothing but the cat.

"I never did see the beat of
that boy!"

EMBEDDING BITMAP FONTS IN PDF FILES

BACKGROUND

A font is an electronic data file containing a set of glyphs, characters, or symbols. The term font may generally refer to a scalable set of digital shapes that may be printed at many different sizes. Some PDF (portable document format) files may include fonts that have not been embedded into the PDF file. That may be due to a copyright restriction that prevents the font from being embedded in the PDF file. One unfortunate result of an un-embedded font is that it may cause discrepancies when the file is printed which could produce unreadable text. PDF reader applications typically replace an un-embedded font with a similar font allowing the PDF file to be rendered and viewed on a computer display. Printing systems, however, may use an inappropriate font, may not allow the PDF file to be printed, or may not print the text of the un-embedded font.

BRIEF DESCRIPTION OF THE DRAWINGS

FIG. 4 illustrates an example embodiment of an original PDF file as it appears on a display.

FIG. 5 illustrates an example embodiment of a modified version of the original PDF file as it appears printed.

DETAILED DESCRIPTION

Figure 1A:
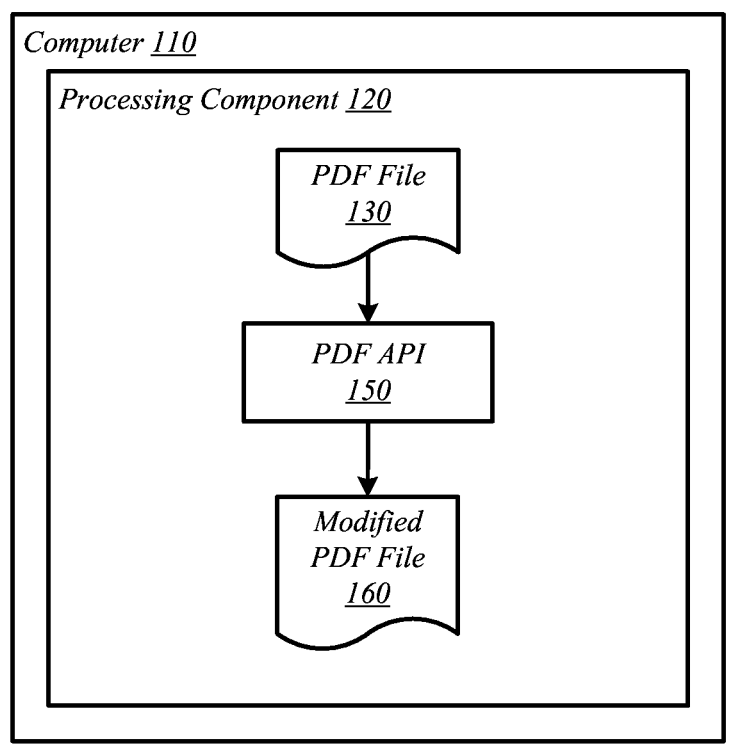
FIG. 1A illustrates a system for modifying documents having un-embedded fonts according to an embodiment of the disclosure.

With general reference to notations and nomenclature used herein, the detailed descriptions which follow may be presented in terms of program procedures executed on a computer or network of computers. These procedural descriptions and representations are used by those skilled in the art to most effectively convey the substance of their work to others skilled in the art.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

A PDF file is a set of images, fonts and streams. The use of PDF guarantees that the original document will exist independently of the hardware or operating system (OS) that was used to create the PDF file. To faithfully print what is displayed, every object pertaining to an image and font should be embedded in the PDF file. Some PDF files may include fonts that have not been embedded into the PDF file. That may be due to a copyright restriction that prevents the font from being embedded in the PDF file. One unfortunate result of an un-embedded font is that it may cause discrepancies when the file is printed which could produce unreadable text. PDF reader applications typically replace an un-embedded font with a similar font allowing the PDF file to be rendered and viewed on a computer display. Printing systems, however, may use an inappropriate font, may not allow the PDF file to be printed, or may not print the text of the un-embedded font.

The un-embedded fonts that have a copyright restriction may allow, however, embedding of a bitmap glyph representation of characters of the un-embedded font according to its fsType flag. A glyph is an element of writing such as one or more individual marks that help define the meaning of what is portrayed. Thus, to print a PDF file containing text that references an un-embedded font, the font absence is addressed by replacing it with a similar font that may be embedded. The lack of font information within the PDF file may lead to poor quality or discrepancies when printing even when a replacement font is used because font replacement does not necessarily guarantee the same font size or same glyph design nor whether all characters will be available.

In one embodiment, the font embedding API searches for and identifies each character of the fonts used in the PDF file and extracts information about the size of each character being represented. Once this information is gathered the process of embedding the font as a bitmap font may commence. The bitmap glyph representations may be stored in the PDF file as bitmap images that may be separated according to available font sizes. The bitmap glyph representation may be stored in the font file as a bitmap image. This bitmap image may be separated according to available font sizes. The API may parse a given font file to obtain the bitmap representation for the characters and size representation used in the PDF file. In case the needed size is not found in the font file, the API may scale the bitmap representation to the needed size when embedding that bitmap glyph representation.

The API may parse the original PDF file to obtain the bitmap representation for the characters and size representation used in the PDF file. The API may then create a new font, such as, for instance, a Type3 font for each size representation and add the character representation to the Type3 font that represents its respective size. Type3 fonts are PostScript fonts that provide very good output quality at every character size. This newly created Type3 font will contain all characters that are represented in the document using glyphs with a specific size.

Once the new Type3 font has been created, the API parses the PDF content stream, searching for references of the un-embedded font. For each reference found the API replaces it with a reference pointing to the created Type3 font that contains the corresponding bitmap character of the appropriate size. The PDF file may now be viewed and/or printed with a suitable replacement font for the un-embedded font.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives consistent with the claimed subject matter.

FIG. 1A illustrates a system for modifying documents having un-embedded fonts according to an embodiment of the disclosure. A computer 110 under control of a processing component 120 may operate on a PDF file. A PDF API 150 may receive a particular PDF file 130. The PDF API 150 may determine that the PDF file 130 contains one or more un-embedded fonts. If the PDF file 130 does contain one or more un-embedded fonts, the PDF API 150 may operate on the PDF file 130 to identify and replace un-embedded font references with original font files or with a newly created Type3 font indicative of bitmap glyph representations of characters of the un-embedded fonts, resulting in a modified PDF file 160.

Figure 1B:
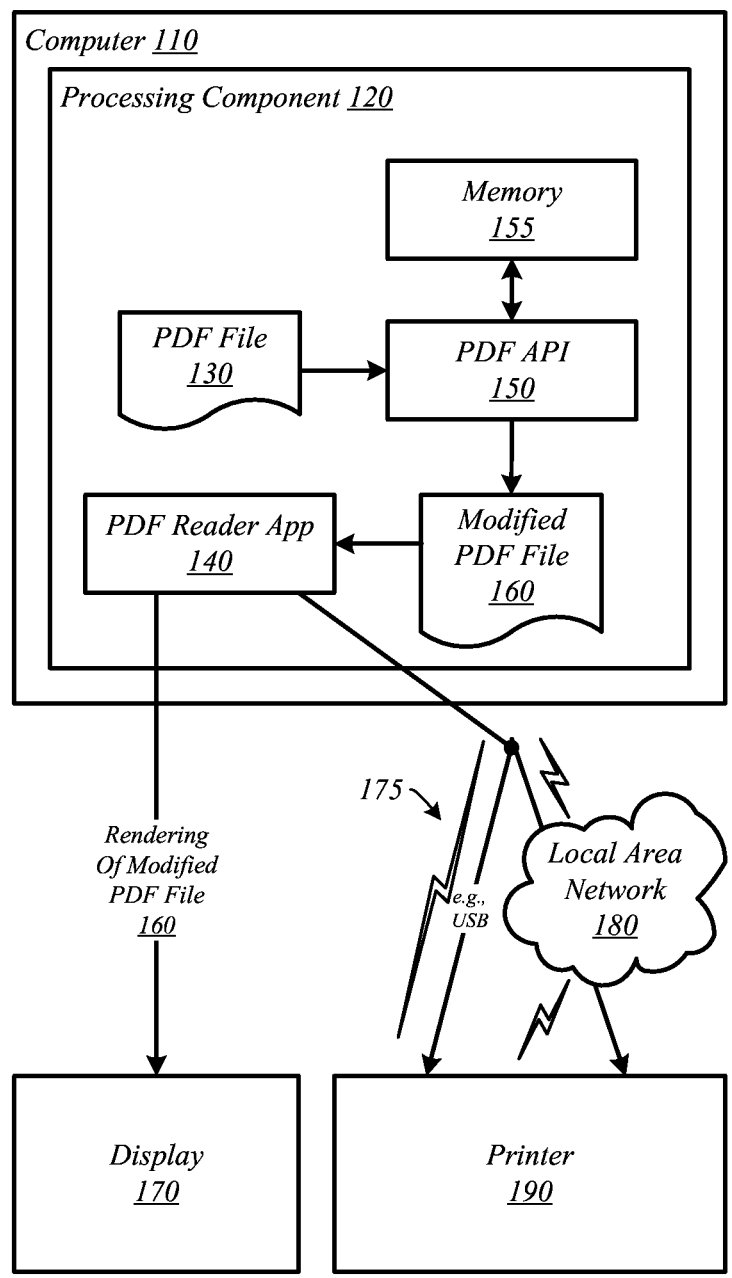
FIG. 1B illustrates an operating environment for modifying and printing documents having un-embedded fonts according to an embodiment of the disclosure.

FIG. 1B illustrates an operating environment 100 for modifying and printing documents having un-embedded fonts according to an embodiment of the disclosure. The computer 110 may also host a PDF reader application 140 capable of rendering PDF files on a display 170 coupled with computer 110 or sending PDF files to a printer 190. The PDF reader application 140 may be a stand-alone application intended solely to view and minimally process (e.g., save, print) the PDF file 130. The PDF reader application 140 may also encompass broader functions that permit the editing of the PDF file 130. In addition, the PDF reader application 140 may be an embedded portion of a larger application that utilizes PDF documents in some manner or fashion.

Identified un-embedded font characters may be stored in a memory 155 that may be accessed by the PDF API 150 during execution. The modified PDF file 160 may then be operated on by the PDF reader application 140. The PDF reader application 140 may be able to send the modified PDF file 160 to a display 170 for visual rendering. The PDF reader application 140 may also be able to send the modified PDF file 160 to a printer 190 either directly 175 (e.g., a USB cable or direct wireless connection like Bluetooth) or via a local area network (LAN) 180 which may be wired (e.g., Ethernet) or wireless (e.g., 802.11). The printer 190 may then print the modified PDF file 160 as a faithful reproduction of the original PDF file 130 on paper.

Figure 2:
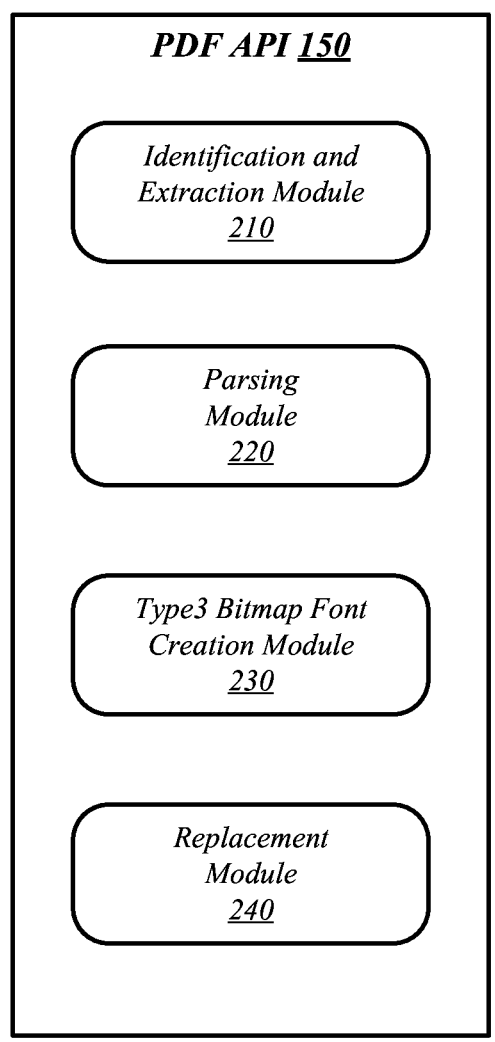
FIG. 2 illustrates a functional representation of an application programming interface (API) according to an embodiment of the disclosure.

FIG. 2 illustrates a functional representation of a PDF application programming interface (API) 150 according to an embodiment of the disclosure. The PDF API 150 may be comprised of several modules including an identification and extraction module 210, a parsing module 220, a Type3 font creation module 230, and a replacement module 240.

The identification and extraction module 210 may be operative to identify and store every character within the PDF file 130 that is associated with an un-embedded font. Characters may include upper and lower case letters, numbers, punctuation marks, and other symbols. In addition, the identification and extraction module 210 may also determine and extract the font size for each character represented in the PDF file 130. The identification and extraction module 210 may then store the character and size information pertaining to all the characters of the un-embedded font in memory 155. Other features such as bold and italic may be identified, extracted and stored for each character as well.

The parsing module 220 may parse a font file given to the PDF API 150 by the user to extract the bitmap glyph representations as bitmap images separated according to available font sizes. The font given by the user may not have the same name as the font in the PDF. To solve this the PDF API 150 may allow the user to specify alternate name for the font files provided, so that it can be matched to the font name in the PDF file 130.

A bitmap font is one that stores each glyph as an array of pixels (that is, a bitmap). Bitmap fonts are simply collections of raster images of glyphs. For each variant of the font, there may be a complete set of glyph images, with each set containing an image for each character. For example, if a font has three sizes, and any combination of bold and italic, then there will be twelve (12) complete sets of images.

An advantage of bitmap fonts is that they are fast and simple to render. A disadvantage of bitmap fonts is that the visual quality tends to be poor when scaled or otherwise transformed, compared to outline and stroke fonts. This may be overcome by providing a separate bitmap font character set for each font size and style (e.g., bold, italic, etc.) and combination thereof.

The Type3 bitmap font creation module 230 may be operative to create and store in memory 155 a new Type3 font based on the bitmap representations obtained above. A new Type3 font may be created for each font size used in the PDF document. The new Type3 bitmap font should contain all the un-embedded font characters that were represented in the PDF file 130 for which there were corresponding bitmap characters represented in the bitmap tables of the original font.

While the memory 155 has been shown as residing locally, the memory may be remotely located and accessible over a network. The Type3 bitmap font file may be uniquely associated to the PDF file 130.

The replacement module 240 may be operative to remove references for the un-embedded fonts and create new references that point to the equivalent created Type3 fonts. This process may create more references than originally presented in the PDF file since it will be necessary to have a different reference for each size of each font, wherein originally only one reference was sufficient to cover all font sizes. Thus, the process is not necessarily a one-to-one relationship wherein one reference is substituted by another. Because of the potential of different font sizes, new references may be created for multiple font sizes in places where only one reference was used before. Once all the reference substitutions are made a modified PDF file 160 may be created. The modified PDF file 160 is now able to be viewed or printed since all references to un-embedded fonts have been replaced with references to newly created Type3 bitmap fonts that are based on the bitmap representations of the original un-embedded fonts.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 3:
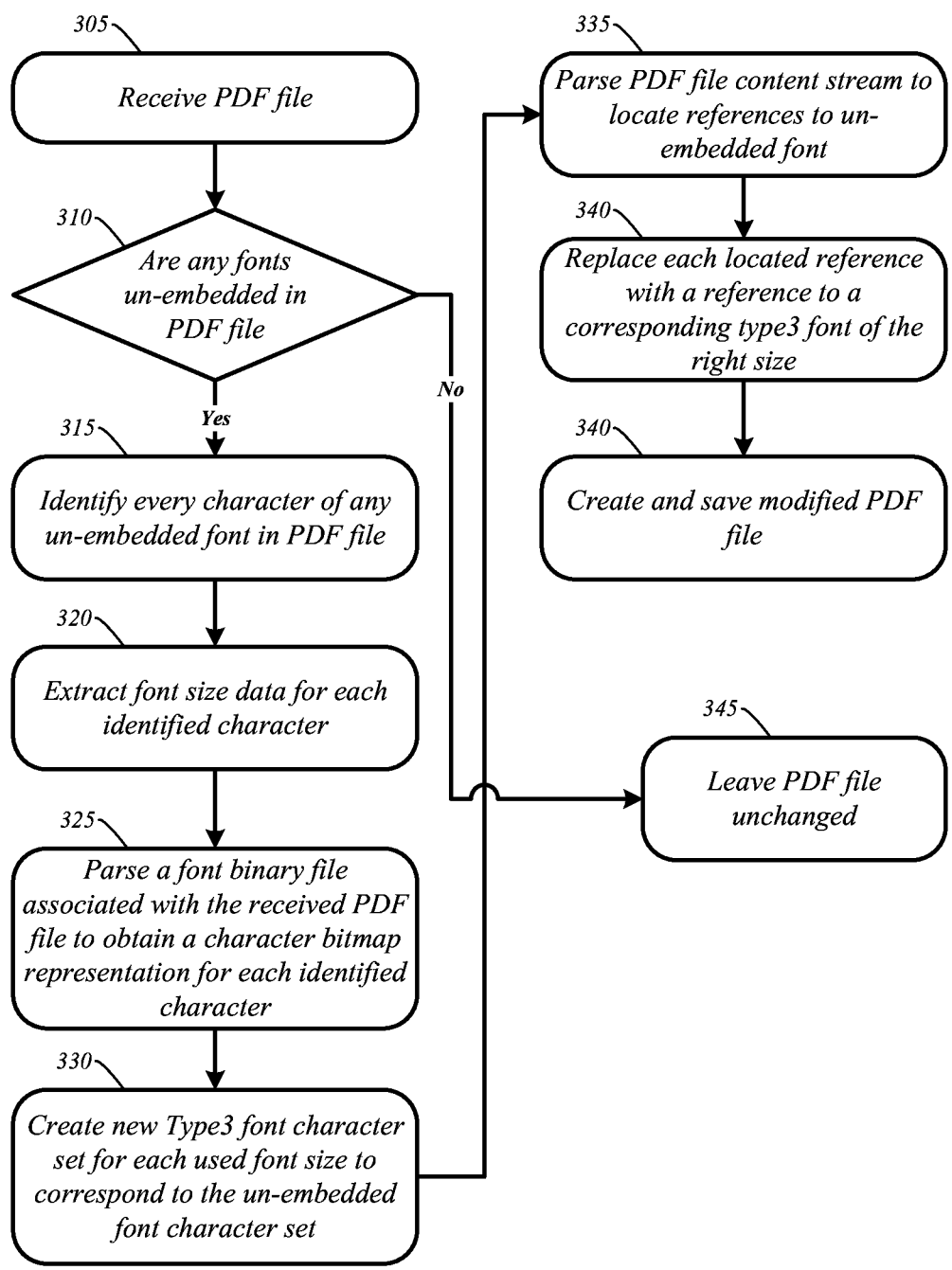
FIG. 3 illustrates an example embodiment of a logic flow.

FIG. 3 illustrates an embodiment of a logic flow 300. The logic flow 300 may be representative of some or all of the operations executed by one or more embodiments described herein. The embodiments are not necessarily limited to the examples described herein. In the illustrated embodiment shown in FIG. 3, the logic flow 300 may identify un-embedded fonts, create new Type3 bitmap fonts corresponding to the un-embedded fonts, and replace any references to un-embedded fonts in a PDF file with references to the corresponding Type3 bitmap fonts.

In the illustrated embodiment shown in FIG. 3, the logic flow 300 may receive a PDF file 130 at block 305. For example, a user may have access to a PDF file 130 on his computer 110. The user may wish to view and perhaps print the PDF file 130. Before the PDF file 130 is viewed or printed it may be forwarded to a PDF API 150 to verify the suitability for viewing and/or printing the PDF file 130.

In the illustrated embodiment shown in FIG. 3, the logic flow 300 may determine if any fonts in the PDF file 130 are un-embedded at block 310. For example, the identification and extraction module 210 within the PDF API 150 may analyze the PDF file 130 to determine if any of the fonts used are not embedded in the file. If there are no un-embedded fonts in the PDF file 130, the PDF file 130 may be left unchanged at block 345. If left unchanged, the PDF file 130 may be viewed by a PDF reader application 140. Within the PDF reader application, a user interface mechanism may be triggered by the user to cause the printing of the PDF file 130 to a printer 190. Otherwise, the logic flow 300 will proceed to block 315.

In the illustrated embodiment shown in FIG. 3, the logic flow 300 may identify and store every character of any un-embedded font in the PDF file 130 at block 315. For example, the identification and extraction module 210 may identify each character and its size associated with an un-embedded font. Those characters may be stored in a memory 155.

The Identification of used font characters and sizes may be made by processing the PDF Content Stream. The Content stream may be comprised of a series of PDF Graphic Operators that are read by the PDF renderer to display the contents of the document. To identify characters and sizes for a specific font, this PDF content stream may be searched for the operators:

Tf—used to define the use of a new font.
TJ, Tj, \"—used to write text in a PDF.
Tm—used to define a Transformation Matrix used to calculate PDF text objects dimensions.

The identification process may comprise parsing the PDF content stream operators storing the last Text Matrix set (Tm) until d a font definition operator (TO is found that matches the reference of the font for which knowledge of the characters and respective sizes is needed. The Tf operator may receive as parameters a reference of the font in the page resources and an un-scaled size for the font being set. The reference may be matched to the reference of the font being searched for and the value of the un-scaled size may be stored for further calculus.

Once a matching Tf is found, subsequent text display operators (TJ, Tj, /") are searched for. These text display operators receive as parameters the characters to be displayed in the document. The size of these characters is calculated by multiplying the un-scaled size of the current defined font by the last Text matrix horizontal scaling value. The characters may then be stored grouped by size.

This process is performed until we reach the end of the PDF content stream to obtain a complete mapping of the characters used by the font organized by size.

In the illustrated embodiment shown in FIG. 3, the logic flow 300 may extract the font size for each identified character at block 320. For example, the identification and extraction module 210 may be further operative to determine the font size of each identified character determined by block 315 above. The font size may also be stored along with the character identification information in memory 155. In addition, other features of the font for each identified character such as bold and italic may also be stored if discovered.

In the illustrated embodiment shown in FIG. 3, the logic flow 300 may parse a font file associated with the received PDF file 130 to obtain a character bitmap representation for each identified character at block 325. For example, the parsing module 220 within the PDF API 150 may parse a font file associated with the PDF file 130 to search for and obtain the bitmap glyph representation for any un-embedded font character. The bitmap data and font size data may then be stored in memory 155.

TrueType and OpenType fonts may store bitmap information to be used when the embedding of the font is restricted. This bitmap information can be found at the tables EBDT, EBLC and EBSC in the font file structure. Using a TrueType and OpenType font file specification, a font file parser may be implemented that can extract the bitmap information contained in the EBDT, EBLC and EBSC tables. The bitmap data in these tables may be separated by character and size since characters of different sizes have different bitmap data. The fonts do not have bitmap data for all the sizes, so for the sizes that are not present in the tables, the representing bitmap data may be obtained by scaling the data from the nearest size that is present at the font file.

Using the mapping of characters used in the PDF file 130 a determination is made as to which of the extracted bitmap data will be included in the PDF file 130.

In the illustrated embodiment shown in FIG. 3, the logic flow 300 may create a new Type3 font character set at block 330. For example, the Type3 bitmap font creation module 230 within PDF API 150 may create a new Type3 bitmap font character set that corresponds on a character by character basis with the bitmap representations stored for the characters of each un-embedded font. Thus, each un-embedded font character identified in the PDF file 130 spawns the creation of at least one corresponding Type3 bitmap font character (more if there are multiple font sizes in play) that is a very faithful reproduction of the original character; note that if the character is used in more than one size, one new character will be created in each size.

For each size used for the un-embedded font being replaced a Type3 font dictionary may be created and added to the document resources. Type3 fonts differ from the other fonts supported by PDF. A Type3 font dictionary defines the font whereas font dictionaries for other fonts simply contain information about the font and refer to a separate font program for the actual glyph descriptions. In Type3 fonts, glyphs are defined by streams of PDF graphics operators. These streams are associated with character names. A separate encoding entry maps character codes to the appropriate character names for the glyphs. The Type3 font dictionary information is assembled using information from the original un-embedded font dictionary and the bitmap data extracted from the font file are used to assemble the /CharProc entry of the Type 3 font dictionary. The /CharProc entry is a map indexed by character names, where each character name has a stream of PDF graphics operators associated to it that defines how to draw that character, these streams may then be written using the information of size, scale and bitmap data.

In the illustrated embodiment shown in FIG. 3, the logic flow 300 may parse the PDF file 130 content stream to locate character references to any un-embedded font at block 335. For example, the replacement module 240 within PDF API 150 may analyze the PDF file 130 content stream on a character by character basis searching for characters associated with an un-embedded font. Each character fitting this description may be addressed to ensure that the PDF file 130 may be printed without error.

In the illustrated embodiment shown in FIG. 3, the logic flow 300 may replace each located reference to a corresponding Type3 bitmap font at block 340. For example, the replacement module 240 may substitute each located reference to a character associated with an un-embedded font with a reference to the corresponding character of the right font size in the newly created Type3 bitmap font that is based on the bitmap representations of the actual character font.

In the illustrated embodiment shown in FIG. 3, the logic flow 300 may create and save a modified PDF file 160 at block 340. For example, once all of the necessary substitutions have been performed, a modified PDF file 160 may be created and saved within computer 110. The modified PDF file 160 may now be accessed and processed by the PDF application reader 140 for viewing, printing, and other modifications if allowed.

In operation, each character not associated with an embedded font that was found in the original PDF file 130 has a corresponding Type3 bitmap font character created based on the bitmap representation of the original character. The new Type3 bitmap font character set further includes the relevant font size and feature (e.g., normal, bold, italic). Thus, there may be a one-to-many correspondence between a character in the original PDF and in the modified PDF, since a reference is needed for each font size and feature. It may be possible, however, for the font file associated with the original PDF file 130 to not have one or all of the necessary characters as bitmap representations. In this case, a new reference will not be included for this font, but the process may continue for other fonts. If the font given has representations of the character but these representations are not in the necessary size, the closest size may be used.

FIG. 4 illustrates an example embodiment of an original PDF file 400 as it appears on a display 170. The original PDF file 130 may be partially displayed here using its original font which may be copyright protected and perhaps not embedded into the PDF file 130. This example illustrates a page from the novel "The Adventures of Tom Sawyer" by Mark Twain. The PDF reader application 140 may be able to render the PDF file 130 using the un-embedded font because the PDF reader application 140 may have knowledge of the font even though it has not been embedded into the PDF file 130. The rendering on display 170 appears true to the intended font.

FIG. 5 illustrates an example embodiment of a printed page 500 for a modified version 160 of the original PDF file 130. Printers, unlike PDF readers may print out characters in which the font for those characters is embedded in the PDF file to be printed. Since some PDF files contain un-embedded fonts, a printer may not be able to print such a PDF file or at least may not be able to print the characters of the un-embedded fonts. In this example, the printer 190 was able to print the screen shown on the display 170 of FIG. 4 because references to characters using the un-embedded font were replaced with references to characters using a Type3 bitmap font created based on the bitmap representation of the un-embedded font.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. A system comprising:
   a processor; and
   a non-transitory storage medium storing instructions executable on the processor to:
      determine whether a portable document format (PDF) file references an un-embedded font that is not embedded in the PDF file;
      in response to determining that the PDF file does not reference any un-embedded font, leave the PDF file unchanged; and
      in response to determining that the PDF file references the un-embedded font, modify the PDF file, the modifying of the PDF file comprising:
         identifying a character, in the PDF file, associated with the un-embedded font;
         extracting a bitmap representation for the identified character associated with the un-embedded font using an associated font file;
         creating a bitmap font character according to a second font from the bitmap representation for the identified character associated with the un-embedded font, wherein the second font is different from the un-embedded font; and
         replacing, in the PDF file, a reference to the identified character associated with the un-embedded font with a reference to the bitmap font character according to the second font.

2. The system of claim 1, wherein the bitmap font character created from the bitmap representation for the identified character in the PDF file associated with the un-embedded font is a Type3 bitmap font character, and the second font is a Type3 font.

3. The system of claim 1, wherein the instructions are executable on the processor to determine a font size for the identified character in the PDF file associated with the un-embedded font.

4. The system of claim 3, wherein the instructions are executable on the processor to determine features for the identified character in the PDF file associated with the un-embedded font, the features including whether the identified character is presented as normal, bold, or italic.

5. The system of claim 4, further comprising a memory to store:
   the bitmap representation for the identified character in the PDF file associated with the un-embedded font including the font size and the features of the identified character, and
   the bitmap font character created from the bitmap representation for the identified character in the PDF file associated with the un-embedded font.

6. The system of claim 1, wherein the modifying creates a modified version of the PDF file comprising the reference to the bitmap font character.

7. The system of claim 6, further comprising a PDF reader application executable on the processor to:
   read the modified version of the PDF file;
   display the modified version of the PDF file on a display; and
   forward the modified version of the PDF file to a printer in response to a print command.

8. The system of claim 1, wherein the instructions are executable on the processor to identify characters in the PDF file associated with multiple un-embedded fonts that are not embedded in the PDF file.

9. The system of claim 1, wherein the modifying of the PDF file further comprises:
creating the second font; and
adding the created bitmap font character to the second font.

10. The system of claim 1, wherein the second font includes a set of glyphs defined by PDF graphics operators.

11. A method performed by a system comprising a processor, comprising:
determining whether a portable document format (PDF) file references an un-embedded font that is not embedded in the PDF file;
in response to determining that the PDF file does not reference any un-embedded font, leaving the PDF file unchanged; and
in response to determining that the PDF file references the un-embedded font, modifying the PDF file, the modifying of the PDF file comprising:
identifying a character, in the PDF file, that is according to the un-embedded font;
extracting a bitmap representation of the identified character that is according to the un-embedded font using an associated font file;
creating a Type3 bitmap font character according to a Type3 font from the bitmap representation of the identified character that is according to the un-embedded font, wherein the Type3 font is different from the un-embedded font; and
replacing, in the PDF file, a reference to the identified character that is according to the un-embedded font with a reference to the Type3 bitmap font character according to the Type3 font.

12. The method of claim 11, further comprising:
determining a font size for the identified character that is according to the un-embedded font;
storing the font size for the identified character that is according to the un-embedded font;
determining features for the identified character that is according to the un-embedded font, the features including whether the identified character is presented as normal, bold, or italic; and
storing the features for the identified character that is according to the un-embedded font.

13. The method of claim 11, wherein the modifying creates a modified version of the PDF file comprising the reference to the Type3 bitmap font.

14. The method of claim 11, wherein the reference to the Type3 bitmap font character is a first reference to the Type3 bitmap font character of a first size, and wherein the replacing further replaces the reference to the identified character with a second reference to the Type3 bitmap font character of a second size different from the first size.

15. The method of claim 11, wherein the modifying of the PDF file further comprises:
creating the Type3 font; and
adding the created Type3 bitmap font character to the Type3 font.

16. The method of claim 11, wherein the Type3 font includes a set of glyphs defined by PDF graphics operators.

17. A non-transitory computer-readable storage medium comprising instructions that, when executed, cause a system to:
determine whether a portable document format (PDF) file references an un-embedded font that is not embedded in the PDF file;
in response to determining that the PDF file does not reference any un-embedded font, leave the PDF file unchanged; and
in response to determining that the PDF file references the un-embedded font, modify the PDF file, the modifying of the PDF file comprising:
identifying a character in a portable document format (PDF) file, the identified character associated with the un-embedded font;
extracting a bitmap representation of the identified character associated with the un-embedded font;
creating a Type3 bitmap font character according to a Type3 font from the bitmap representation of the identified character associated with the un-embedded font, wherein the Type3 font is different from the un-embedded font; and
replacing, in the PDF file, a reference to the identified character associated with the un-embedded font with a reference to the Type3 bitmap font character according to a Type3 font.

18. The non-transitory computer-readable storage medium of claim 17, comprising instructions that when executed cause the system to:
determine a font size for the identified character associated with the un-embedded font; and
determine features for the identified character associated with the un-embedded font, the features including whether the identified character is presented as normal, bold, or italic.

19. The non-transitory computer-readable storage medium of claim 17, comprising instructions that when executed cause the system to store the Type3 bitmap font character created from the bitmap representation of the identified character associated with the un-embedded font.

20. The non-transitory computer-readable storage medium of claim 17, wherein the modifying of the PDF file further comprises:
creating the Type3 font; and
adding the created Type3 bitmap font character to the Type3 font.

21. The non-transitory computer-readable storage medium of claim 17, wherein the Type3 font includes a set of glyphs defined by PDF graphics operators.

* * * * *